No. 730,281. PATENTED JUNE 9, 1903.
G. F. MEIER.
ADDING MACHINE.
APPLICATION FILED FEB. 28, 1902.
NO MODEL. 5 SHEETS—SHEET 1.
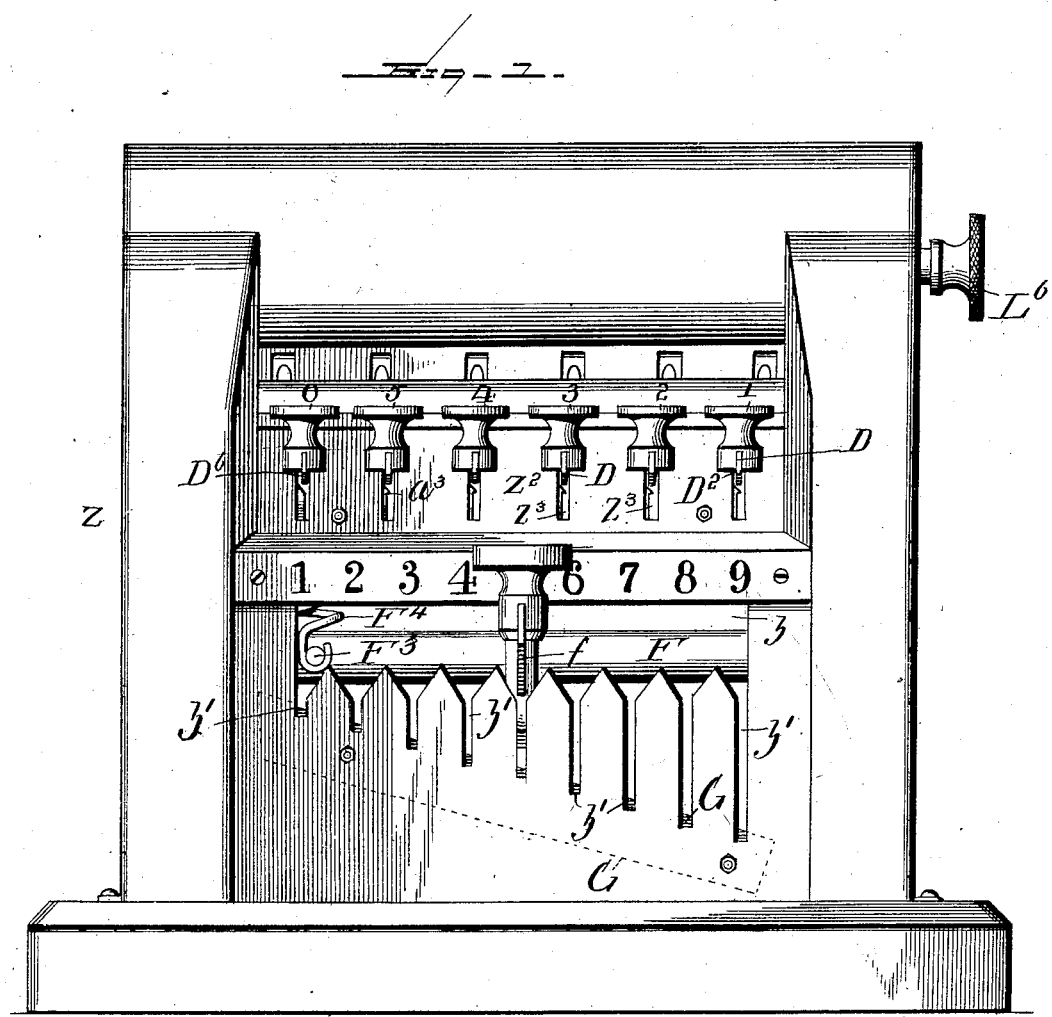

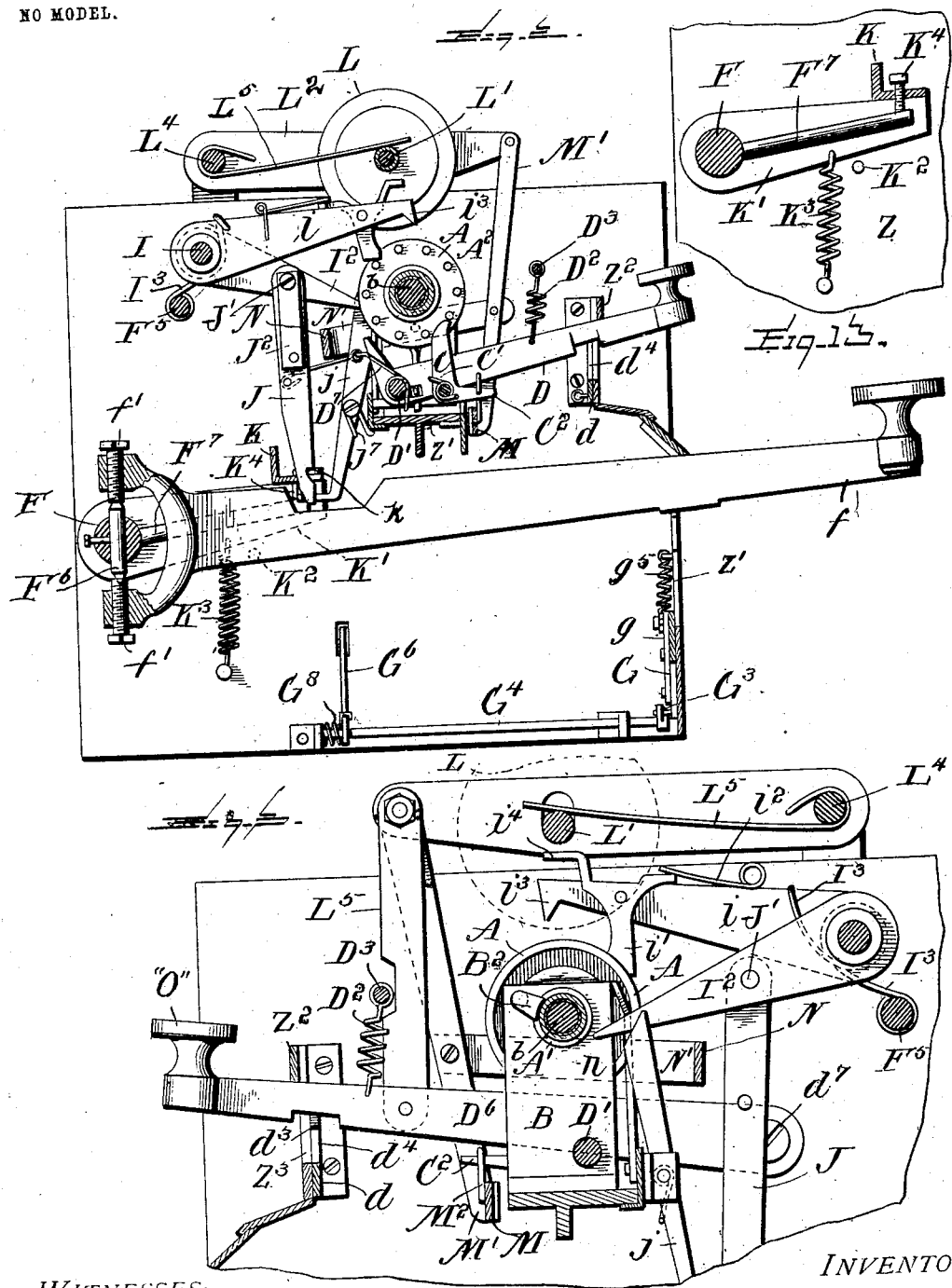

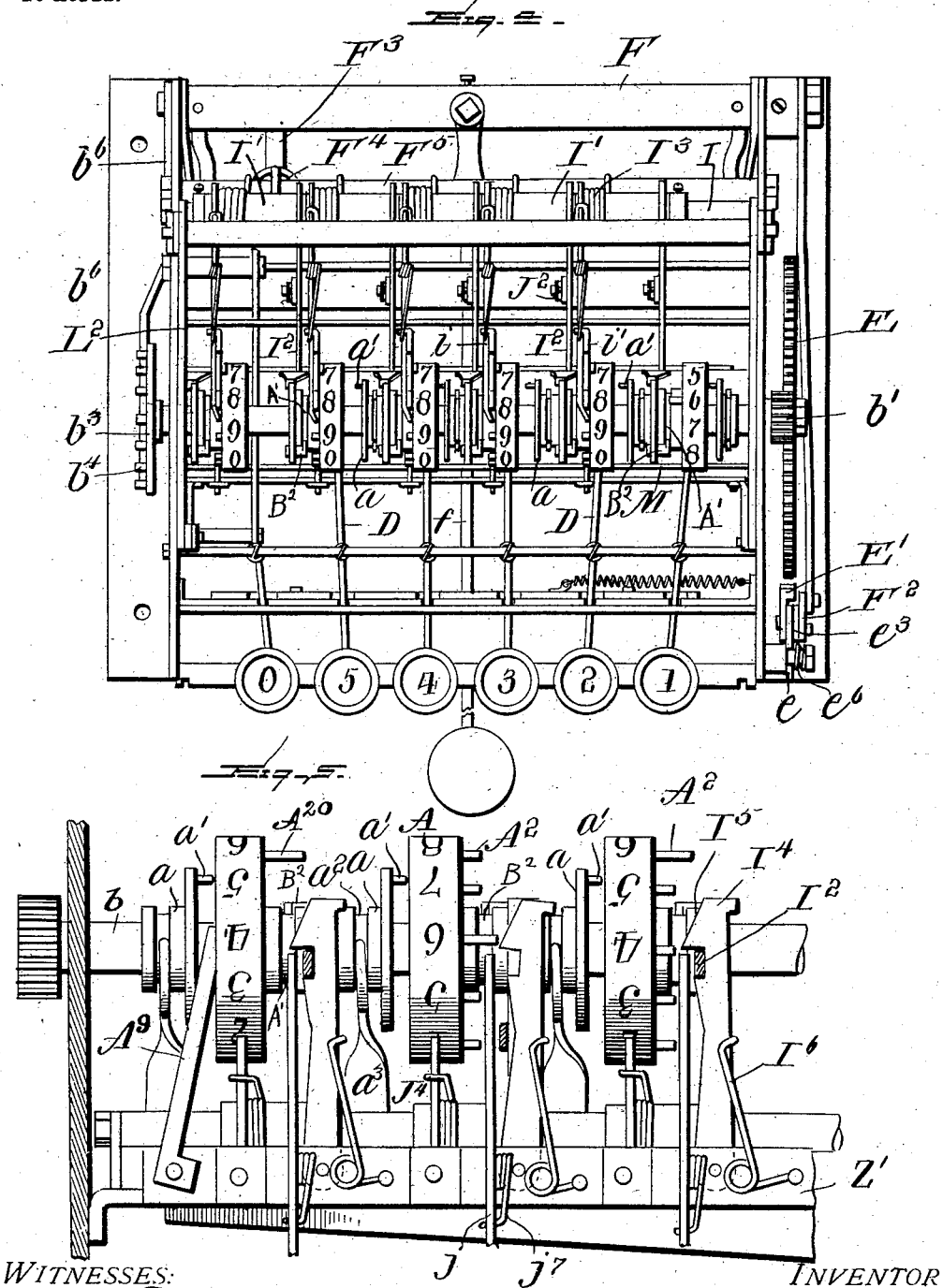

No. 730,281. PATENTED JUNE 9, 1903.
G. F. MEIER.
ADDING MACHINE.
APPLICATION FILED FEB. 28, 1902.
NO MODEL. 6 SHEETS—SHEET 4.
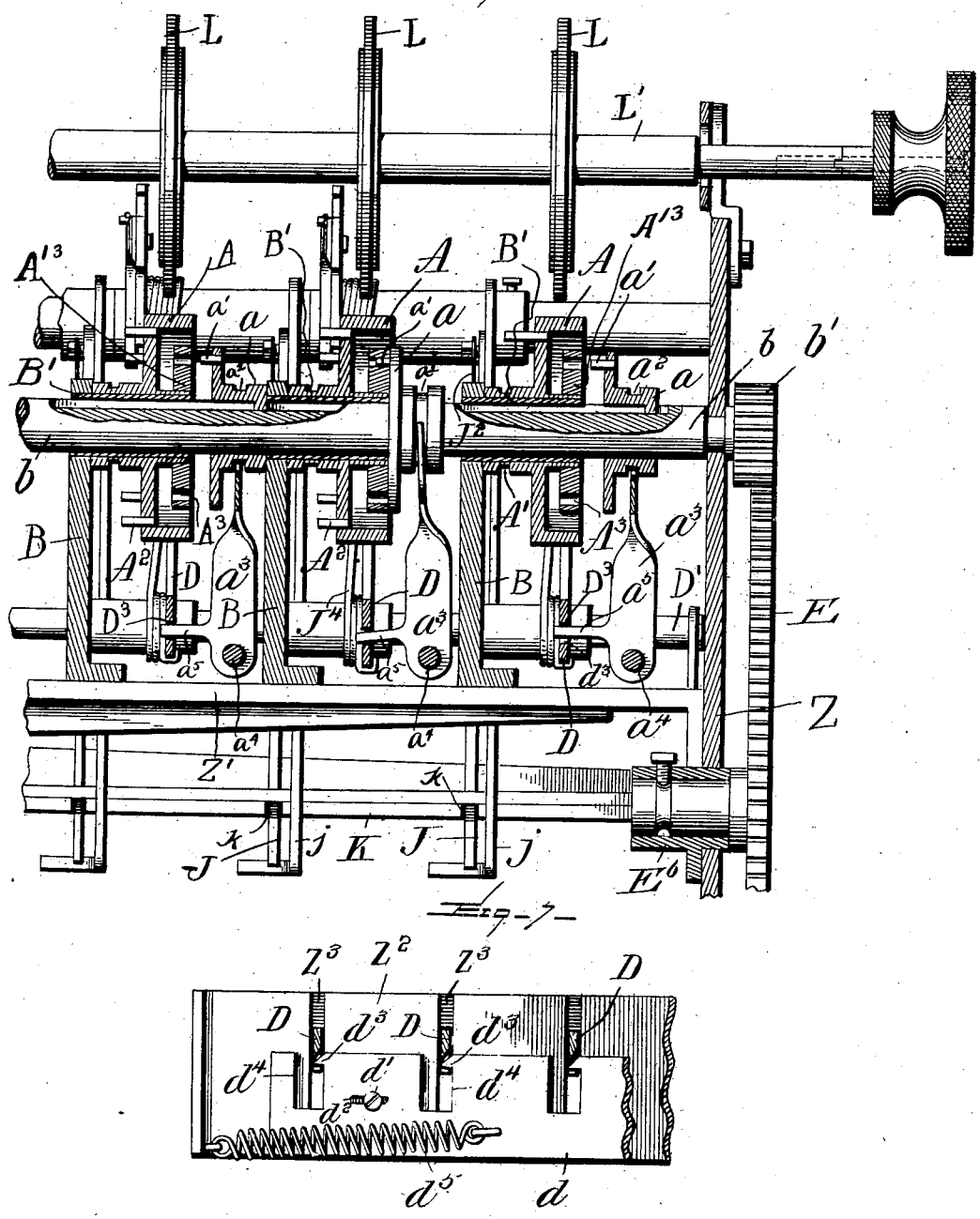
WITNESSES:
W<sup>m</sup> F. Doyle.
James R. Mansfield
INVENTOR
George F. Meier.
BY Alexander & Dowell
Attorneys

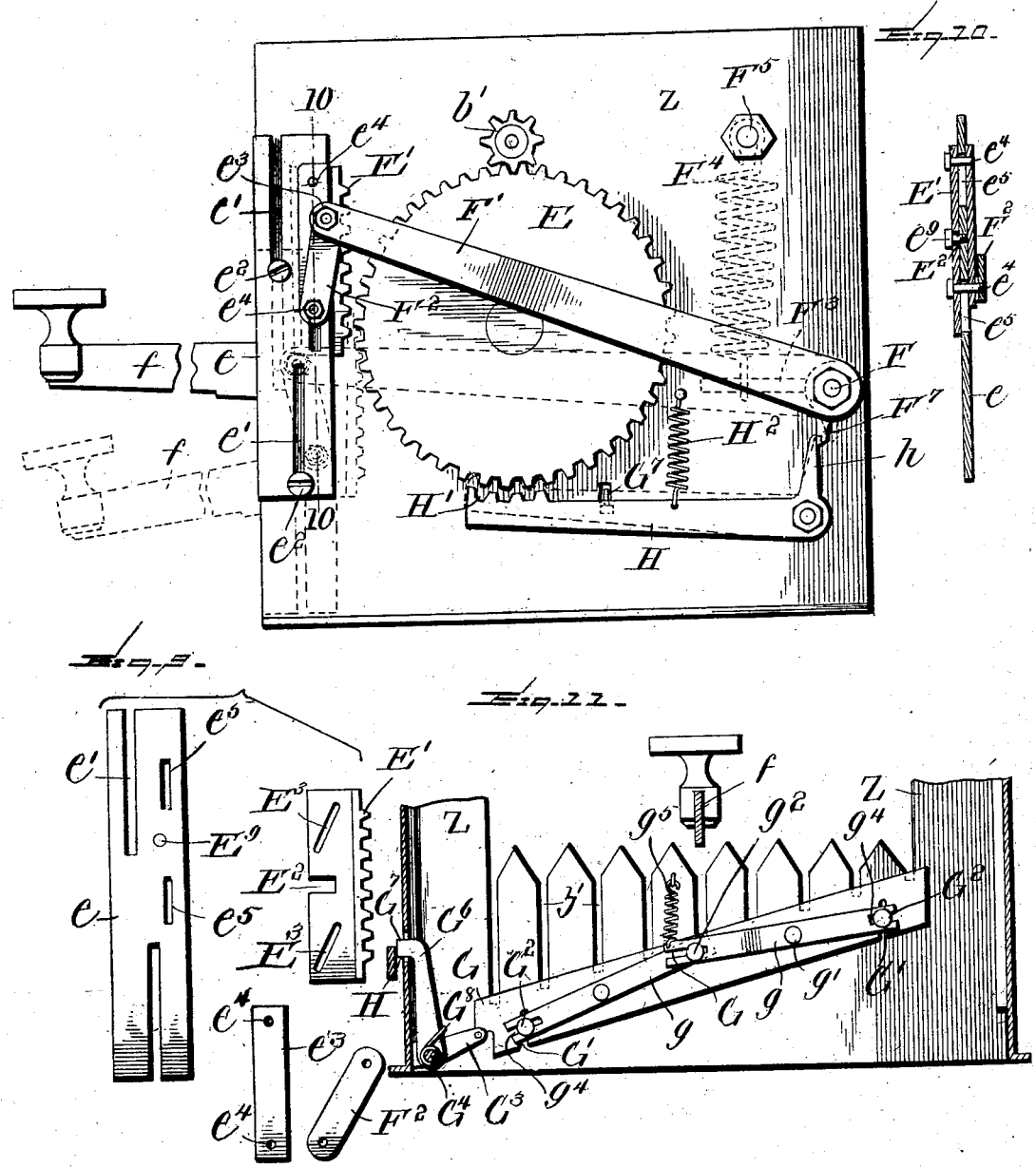

No. 730,281. Patented June 9, 1903.

UNITED STATES PATENT OFFICE.

GEORGE FRED MEIER, OF MUSCATINE, IOWA.

ADDING-MACHINE.

SPECIFICATION forming part of Letters Patent No. 730,281, dated June 9, 1903.

Application filed February 28, 1902. Serial No. 96,121. (No model.)

*To all whom it may concern:*

Be it known that I, GEORGE FRED MEIER, of Muscatine, in the county of Muscatine and State of Iowa, have invented certain new and useful Improvements in Adding-Machines; and I hereby declare that the following is a full, clear, and exact description thereof, reference being had to the accompanying drawings, which form part of this specification.

This invention is an improvement in calculating-machines particularly designed for use in adding numbers; and its object is to produce a compact, efficient, and reliable machine of this character.

The invention consists in the novel combinations and constructions of parts hereinafter claimed, and the accompanying drawings illustrate a machine embodying the several features of the invention in the best form now known to me and which I shall hereinafter describe in detail without thereby restricting myself to the specific features of construction shown in the drawings, as skilled mechanics could alter and change the machine, so as to vary the appearance thereof and its parts, while retaining many or all of the essential characteristics of the invention as covered in some one or more of the claims.

The invention comprises, first, a novel means of supporting the registering-disks and for throwing any of such disks into or out of operative position; second, novel means for imparting rotative movements to such disks; third, novel means for preventing backlash of the actuating mechanism; fourth, novel "carry-over" mechanism; fifth, novel means for resetting the carrying-over devices; sixth, novel means for resetting the disks to zero position, and, seventh, novel combinations of such mechanisms.

In the drawings, which illustrate the best form of machine now known to me, but which is not the final or only embodiment of the invention, Figure 1 represents a front view of the complete machine. Fig. 2 is a longitudinal vertical section thereof with casing removed looking from the left-hand side of the machine. Fig. 3 is an enlarged reverse section taken from the right-hand side of the machine. Fig. 4 is a top plan view of complete machine with cover removed. Fig. 5 is an enlarged rear elevation of a set of registering-disks and connections. Fig. 6 is an enlarged longitudinal section through a set of registering-disks and their connections. Fig. 7 is a detail view of the disk-setting-lever catch. Fig. 8 is a side elevation of the device with cover removed, showing the disk-rotating mechanism. Fig. 9 is a detail view of parts of such mechanism. Fig. 10 is a sectional view on line 10 10, Fig. 8. Fig. 11 is a detail view illustrating part of the devices for releasing the locking-lever H. Fig. 12 is a detail view of the stop devices for shaft $b$. Fig. 13 is a detail view of the connection between shaft F and bar K.

Any desired number of registering-disks A are arranged in axial alinement in the usual manner, six being indicated in the drawings. Each disk is loosely and independently journaled on a horizontal sleeve $B'$, attached to a short standard B, these standards being fixed to a horizontal bar $Z'$, secured in the main frame Z. The disks are kept from longitudinal movement on sleeve $B'$ by any suitable means. For example, fingers $B^2$ may be attached to standards B beside the disks and engage annular grooves $A'$ in the hubs of the disks, as shown. Each disk A (except the right hand or "units-disk") is provided on its left face with ten pins $A^2$, which are used in carrying over operations. To prevent backward rotation of the disks, dogs C are pivoted on brackets B and engage these pins $A^2$, being thrown into engaging position by springs $C'$, as indicated in Fig. 2.

Extending axially through the series of disks A and the sleeve $B'$ is a rotatable shaft $b$, on which beside each disk A (except the last or left-hand disk) is splined a clutch $a$, having a pin $a'$ adapted to engage with one of a series of ten holes $A^3$ in a disk or flange $A^{13}$ on the hub of the opposed adjoining disk A when the clutch is moved thereagainst. Each clutch $a$ is controlled by a clutch-lever $a^3$, pivoted at its lower end on bar $Z'$, as shown at $a^4$, while its upper end engages an annular groove $a^2$ in the hub of the clutch. The clutch-lever has a laterally-projecting stud $a^5$, which enters a hole $D^3$ in the adjoining related setting-lever D, which is pivoted on a shaft or rod $D'$, attached just above bar $Z'$. (See Fig. 2.) These levers extend forward and out of the casing, passing through a slotted front bar $Z^2$ thereof. Each lever is normally uplifted by a spring $D^2$, connected to an overlying rod $D^3$, secured in the frame, and the related clutch $a$ is held out of engagement with the related disk A so long as the lever D remains in uplifted position. When a lever D is depressed, it rocks the connected clutch-lever $a^3$, throwing its clutch $a$ into engagement with related disk A, and the latter can then be actuated by rotating the shaft $b$ until the clutch is released. The lever D is held down when depressed by means of a catch-plate $d$, which is attached to the plate $Z^2$ by means of screws $d'$ engaging slots $d^2$ (see Fig. 7) in plate $d$. Plate $d$ has a vertical slot $d^4$ for each lever D, slots $d^4$ registering with the guide-slots $Z^3$ in plate $Z^2$, and at one side of each slot $d^4$ is a catch $d^3$. When any lever D is depressed, it engages the beveled mouth of the related slot in plate $d$ and forces the plate slightly to one side until the lever passes below catch $d^3$, when the plate $d$ is thrown forward by a spring $d^5$, as shown, causing catch $d^3$ to engage the upper side of lever D and hold it down, thus bringing its related disk into operative condition. When any other lever is depressed, the plate $d$ will be first forced back, so as to release the first depressed lever, which is immediately raised out of its slot $d^4$ by its spring, while the second depressed lever is caught and held down. Thus any lever D may be depressed and locked down; but any previously-depressed lever will be simultaneously released. The last or left-hand lever $D^6$, carrying the key marked O in the drawings, I use only as a setting device, and the slot $d^4$ in plate $d$, which is engaged by this setting-lever $D^6$, has no catch $d^3$, so that by depressing key O any previously depressed and locked lever D will be released and all the disks be freed from their clutches. The lever $D^6$ is pivoted on a stud $d^7$ in rear of bar Z', as shown in Fig. 3.

Each lever D carries a key, which are numbered 1, 2, 3, 4, 5, and 0 from right to left, 1 being the units-key, 2 the tens-key, and so on, the "0" key being the setting-key, as above stated. Only that disk whose corresponding key is depressed will be brought into operation. In adding units key 1 will be depressed and remain down until the addition of units is completed. To add hundreds, key 3 will be depressed and held down until the addition is completed in like manner. Only the key for the denomination being added will be depressed. These keys 1 to 5 do not cause the turning of the disks, but only control their operative or inoperative condition. The rotation of any disk which is brought into operative position is effected as follows:

On one end of shaft $b$ is a small pinion $b'$, which meshes with a gear E, journaled in a bushing $E^6$, attached to the side of the frame Z. Gear E is preferably a large gear and is given a partial rotation at each depression of the adding-key lever, hereinafter described, by any suitable means. As shown, a short toothed rack E' is arranged opposite the gear E, said rack having a horizontal slot $E^2$, by which it is supported and guided on a pin $e^9$ on a slide $e$, having slots $e'$, engaged by pins $e^2$, attached to the frame Z. The rack also has inclined slots $E^3$, engaged by pins $e^4$, on a plate $e^3$, lying against slide $e$, pins $e^4$ passing through vertical slots $e^5$ in slide $e$ and being headed on their inner ends, so as to hold the rack and plate to the slide. The movement of the slide $e$ should be retarded by any suitable means, (a frictionally-acting spring $e^6$ being shown for that purpose,) so that plate $e^3$ will move to the extent permitted by slots $e^5$ before the slide will move, so that the rack-plate $e'$ will be thrown outwardly into engagement with the teeth of gear E before it is lowered with slide $e$ and will be retracted out of mesh with gear E before it can ascend with the slide. The slide $e$, plate, and rack are reciprocated vertically by means of a lever F', Fig. 8, attached at its rear end to a rock-shaft F, journaled in the main frame and connected at its front end by a link $F^2$ to plate $e^3$, as shown in Fig. 8. Shaft F is returned by a spring, so as to normally raise lever F' and hold slide $e$ in uppermost position. A spring $F^4$, attached to an arm $F^3$ on the shaft and to a stationary cross-bar $F^5$ in the frame, is shown for this purpose.

*The adding-lever connections.*—The adding-key lever $f$ is connected to shaft F to rock the same and cause it to depress slide $e$. The rear end of lever $f$ is bifurcated and embraces a double-pointed pin $F^6$, (see Fig. 2,) transfixing the shaft F at center, the bifurcation of lever $f$ being provided with adjustable bearing-screws $f'$, supporting the lever on the pin. This construction enables the lever $f$ to swing laterally and horizontally on the shaft, while any vertical oscillation of the free end of lever will rock the shaft F. Lever $f$ extends forward and out of the front of the casing through a suitable opening $z$ therein, below which opening are a series of nine vertical slots $z'$, with either of which the lever may be engaged by first moving it horizontally in opening $z$ until it comes over the proper slot and then depressing it vertically into the slot. To facilitate the entrance of the lever into the slots, their upper ends are widened, as shown. On the front of casing above the slots $z'$ are index-numerals "1" to "9," inclusive, "1" being over the shallowest slot and "9" over the deepest. These slots are so proportioned in depth that if lever $f$ be depressed into the "1" slot the rack E' (through the described connections) will actuate gear E sufficiently to cause it to rotate shaft $b'$ one-tenth of a revolution, while if lever $f$ be depressed into the "9" slot shaft $b'$ will be rotated nine-tenths of a revolution. Within the casing and extending across the lower ends of slot $z'$ is a bar G, (see Fig. 11,) which has vertical slots G' in its ends, engaging guide-pins $G^2$, attached to the casing. To this bar are pivoted at $g'$ two equal-armed levers $g$, the inner ends of which are slidably connected by a pin $g^2$ and slot $g^3$, their outer ends being slotted at $g^4$ and sliding upon pins $G^2$. The inner end of one of the levers is connected by a lifting-spring $g^5$ with the casing, the combination resulting in keeping the bar G normally raised above the lower ends of slots $z$, so that it can be depressed by lever $f$ in any slot $z'$ and further causing bar G to descend bodily and equally when depressed by lever $f$. One end of bar G engages a crank $G^3$ on a rock-shaft $G^4$, that extends back to and below gear E and on its rear end has an arm $G^6$ mounted thereon and held up to its work by a spring $G^8$, as shown. Arm $G^6$ is provided with a tooth $G^7$, that projects through an opening in the side frame over a locking-lever H, which is pivoted to the frame below gear E and is provided with teeth H' on its free end adapted to engage the teeth of gear E and lock the latter, a spring $H^2$ being provided to throw the lever into engagement with the gear when permitted by dog $G^7$, which normally projects into the path of the lever and prevents the spring lifting it. The lever H has a short arm $h$, which is engaged by an arm $F^7$ on shaft F when lever F' rises and rocks lever H, so as to disengage it from the gear E and hold it disengaged until the adding-lever $f$ is depressed. Arm $F^7$ then releases lever H; but dog $G^7$ still holds it out of engagement with gear E until bar G is depressed by lever $f$, thereby rocking shaft $G^4$ and causing dog $G^7$ to release lever H, which immediately locks wheel E and prevents momentum throw or backlash thereof, thus insuring accuracy of register. When lever $f$ is raised, arm $F^7$, engaging arm $h$, disengages lock H from gear E and permits dog $G^7$ to lock it, as before, until lever $f$ is again fully depressed into some one of the slots $z'$. To insure that clutches $a$ will be in proper position to engage with their respective disks A when moved toward them and to hold shaft $b$ stationary during lateral motions of lever $f$, a disk $b^3$ is fixed to the left-hand end of shaft $b$, said disk having ten pins $b^4$, between any two of which a pointed tooth $b^5$ on an arm $b^6$, attached to the rock-shaft F, will engage when lever $f$ is in raised position. The tooth $b^5$ is disengaged from disk $b^3$ just as rack E' engages gear E, and as the latter disengages gear E tooth $b^5$ engages disk $b^3$, so that the shaft $b$ is always under positive control and irregular movements thereof prevented.

From the foregoing description it will be seen that the operator can bring any of the registering-disks 1 to 5 into operation by depressing the proper lever D, which causes the locking of such disk to shaft $b$. Then by vertically vibrating lever $f$ he can rotate shaft $b$ and the disk locked thereto. Each time lever $f$ is depressed into slot $z'$ shaft F is rocked and gear E is rotated more or less. The full depression of lever $f$ causes dog $G^4$ to release lock H, which is thrown up into engagement with gear $e$ by spring $H^2$ and locks shaft $b$ until lever $f$ rises and shaft F returns to almost normal position, when arm $F^7$ engages arm $h$ and throws the lock out of mesh with gear E and dog $G^6$ springs out and holds the lock down until lever $f$ is again fully depressed.

*The carry-over mechanism.*—In order to effect the carrying over from a disk of lower denomination to the disk of next higher denomination when the former has made or makes a complete revolution, the following mechanism is used: On a transverse shaft I in rear of the disks are supported short sleeves I', each having two arms $i$ and $I^2$. Five of such sleeves are shown, one for each pair of disks. (See Figs. 2, 3, and 4.) The arm $I^2$ projects beside the face of the disk of the lower denomination, and the arm $i$ projects over and beside the adjoining disk of the next higher denomination. A spring $I^3$ is coiled around the sleeve, one end being fast to rod $F^5$ and the other end being fast to arm $i$, so that said spring tends to rotate the sleeve and depress the arms. The arms are, however, normally upheld by means of a catch-lever $I^4$, which is pivoted on bar Z' beside the disk and is held in position to engage arm $I^2$ by a spring $I^6$. Said catch has a projecting beveled nose $I^5$, which is adapted to be struck by an elongated pin $A^{20}$ on the carrying-disk when the latter makes a complete revolution, said pin forcing catch $I^4$ back, and thereby disengaging it from arm $I^2$ and permitting the spring I to throw the arm $I^2$ down. The arm $i$ carries a dog $i'$, which when the arm $i$ is depressed engages one of the pins $A^2$ of the adjoining disk A and moves the latter one notch. The arm $i$ has a nose $i^3$, which will engage the pins $A^2$ and prevent dog $i'$ rotating the disk more than one tooth or notch at a time. Dog $i'$ is yieldingly held in operative position by a spring $i^2$. (See Figs. 2 and 3.) Thus each time catch $I^4$ releases arm $I^2$ the adjoining registering-disk is moved one notch. The carry-over arms $I^2$ $i$ are reset after each operation by the following means: Suspended from each arm $I^2$ is a link J, which is hung on a pin J', attached to arm $I^2$ and provided with a flat friction-spring $J^2$, engaging the head of the pin J' to prevent idle oscillations of the link. The lower end of link J depends through a slot $k$ in a transverse bar K, which is attached to arms K', loosely hung on shaft F and adapted to rest upon pins $K^2$, attached to the sides of the frame. A spring $K^3$ is attached to each arm K' and the frame to hold the arms down on the pins. The bar K is, however, normally uplifted by means of arms $F^7$, attached to shaft F and underlying bar K, the latter being provided with adjusting-screws $K^4$ to contact with said arms $F^7$, and when shaft F is in normal position (with lever $f$ raised) bar K will be uplifted by arms $F^7$. The lower ends of links J are notched to engage the bar K when moved forward; but they will pass idly through the slots unless pulled forward. To positively shift the arms J in engaging position, an oscillating lever $j$ is pivoted beside each catch I² (see Figs. 2 and 5) in position to have its upper edge $j'$ engaged by the carry-over pin $A^{20}$ after the latter has forced the catch-lever I⁴ to release the arm I². The lower end of lever $j$ depends below bar K and is bent rearwardly and partly behind the lower end of the adjoining link J, as shown in Fig. 2, so that when the upper end of lever $j$ is forced outwardly its lower end will be moved inwardly and swing the lower end of link J into engagement with the bar K, so that when said bar rises it will lift link J and arms I² and $i$ until catch I⁴ engages and locks arm I². The upper end of lever $j$ is normally forced inwardly by spring $j^7$. Links J may also be pulled forward by springs J⁴, connected thereto by short links J⁵. The levers D, however, are provided with horns D⁷, which engage the upper ends of the springs and force them backward when the lever D is in uplifted position, as in Fig. 2; but when the lever is depressed springs J⁴ come into action.

*The setting-lever.*—The setting-lever D⁶ is employed whenever it is desired to recommence any adding operations or to set the disks at zero. Above the series of disks A is a corresponding series of friction-disks L, (see Figs. 2 and 3,) mounted upon a common shaft L′, which is loosely journaled in arms L², attached to a rock-shaft L⁴, springs L⁵ being arranged to hold the shaft L′ down yieldingly in its bearings. One of the arms L² is connected by a link L⁵ to the lever D⁶, so that when said lever is depressed friction-disks L will be brought into contact with the registering-disks A. Shaft L′ may be rotated by a hand-piece L⁶ on one end. In order to disengage dogs C from the registering-disks to permit their resetting, a bar M is suspended by links M′ from arms L², said bar extending beneath the tails C² of the dogs and being provided with loops M², adapted to engage the tails of the dogs when the bar M is depressed and throw the dogs out of position to lock disks A. In order to prevent any of the arms $i$ interfering with the resetting of the disks in case any of these arms should happen to be in depressed position, a lifting-bar N is arranged beneath the series of arms I² and normally lies in a non-interfering position, being supported on the rear ends of rocking levers N′, fulcrumed on pins $n$, attached to the side frames. The forward ends of levers N′ are pivotally connected to links M′, so that when bar M is depressed bar N will be raised and will lift any arm I² which might be depressed into engagement with its catch I⁴, at the same time raising arms $i$, so as to lift their noses $i^3$ out of the way of the pins on the registering-disks. Further, to prevent the dogs $i'$ interfering with the backward rotation of the disks A during the resetting operation the dogs $i'$ are provided with horns $i^4$, which will be engaged by shaft L′ when the latter is depressed, and thereby throw the dogs $i'$ out of the way of the pins on the registering-disks. Thus upon the depression of lever D⁶ the dogs C, arms $i$, and dogs $i'$ are all thrown out of position to engage the disks A, while the friction-disks L are brought into contact with the disks A, and by rotating disks L, so as to turn the registering-disks backward, the latter can be brought up to zero position, being stopped at such position by pins $A^{20}$, engaging the heads of latches I⁴. The highest left-hand disk A need have but the carry-over pin $A^{20}$, and is so shown, and therefore no dog C is shown in connection therewith. Instead a friction-spring A⁹ is arranged to bear thereagainst with sufficient pressure to prevent casual rotation thereof.

Operation.—The disks A being set at zero, the operator wishing to add a column of figures must first depress the units-lever D (marked 1 in the drawings) and then depresses lever $f$ at the proper notch for each numeral in the units-column. He then depresses the tens-key, (marked 2 in the drawings,) which causes the release of the units-lever, and proceeds to depress lever $f$ in the proper notch for each numeral in the tens-column. In like manner he successively adds up the hundreds, thousands, &c., until the addition is complete, it being observed that in this machine only one denomination is added at one time, and care should be taken that no two levers D are simultaneously depressed or down during adding operations. The total sum of the additions can be read at any time at the sight-openings. When one sum is completed and it is desired to reset the machine, lever D⁶ (marked 0 in the drawings) is depressed, which releases all the registering-disks, as above described, and enables them to be speedily turned to zero position by properly turning shaft L′. When no levers D are depressed, the registering-disks remain free of shaft $b$ and will not be affected by the depression of the adding-lever $f$.

The subsidiary operations of the several mechanisms are fully set forth in the preceding specific descriptions of such devices, and it is unnecessary to repeat the same here.

I do not restrict myself to the specific constructions of parts shown and described nor to the specific combinations of parts so constructed except where particularly mentioned in the claims, for a skilled mechanic can simplify or change the appearance of parts without altering their essential functions or mode of operation, and therefore I refer to the following claims, rather than to the preceding description, for summaries of the features and combinations for which I desire protection.

Having thus described my invention, what I therefore claim as new, and desire to secure by Letters Patent thereon, is—

1. In combination a registering-disk, a rotatable clutch beside the disk, and a key-lever and connections for engaging and disengaging the clutch from the disk; with a single adding-lever and connections for imparting variable rotative movements from the lever to the clutch, substantially as described.

2. In combination a plurality of registering-disks in axial alinement, a rotatable clutch beside each disk, in alinement therewith and a lever and connections for imparting variable rotative movements to the clutches; with key-levers and connections for engaging and disengaging any of the clutches with their respective disks, substantially as described.

3. In combination, a plurality of independent registering-disks, a rotatable clutch beside each disk, and a single lever and connections for imparting variable degrees of simultaneous rotative movements to the clutches; with key-levers and connections for engaging and disengaging the clutches with their respective disks, substantially as described.

4. The combination of a registering-disk, a rotatable shaft, a clutch for locking the disk to the shaft, and a key-lever for controlling said clutch; with an adding-lever and connections for imparting different degrees of rotative movements to the shaft from said lever.

5. In combination, a plurality of registering-disks, a common rotatable shaft, clutches for locking the disks to the shaft, independent key-levers for controlling the clutches to lock either disk to the shaft and means for imparting varying rotative movements to said shaft.

6. In an adding-machine, the combination of a plurality of registering-disks, a common rotatable shaft, clutches for locking the disks to the shaft, and independent key-levers for controlling the clutches of the several disks to lock either disk to the shaft; with means for imparting any of a series of partial rotations to the shaft and thereby rotating the disks locked thereto, substantially as described.

7. In combination, a registering-disk, a stationary support upon which said disk is journaled, a rotatable clutch and a key-lever and connections for throwing the clutch into or out of engagement with the disk; with a single vibratable lever and connections for imparting variable rotative movements from and by said lever to said clutch, substantially as described.

8. In combination, a series of registering-disks stationary supports for said disks, a rotatable shaft transfixing the disks and supports, clutches splined on the shaft and key-levers and connections for throwing the clutches into or out of engagement with the several disks; with a vibratable lever and connections for imparting variable rotative movements to said shaft, substantially as described.

9. The combination of the registering-disks, a shaft for rotating said disks, a gear for actuating said shaft, a rack-plate beside the gear, and a rock-shaft and connections for reciprocating said rack-plate, and means whereby said plate is thrown into and out of mesh with said gear; with a vibratable lever for rocking said shaft and means for varying the throw of said lever, substantially as described.

10. The combination of the registering-disk, the shaft for rotating the disk, a large gear for rotating the shaft a slide beside the gear, a rack-plate connected to said slide, by pins and inclined slots, a rock-shaft and connections whereby said slide is reciprocated from said shaft, and means for locking the gear after the slide is depressed, substantially as described.

11. The combination of the registering-disk, the shaft for rotating the disk, a large gear for rotating the shaft, a slide beside the gear, a rack-plate connected to said slide, by pins and inclined slots, and a rock-shaft and connections whereby said slide is reciprocated from said shaft; with means for locking the gear after the slide is depressed, and a laterally-vibratable and vertically-movable key-lever connected to and operating said shaft, substantially as described.

12. The combination of the registering-disks, a rotatable shaft for actuating the same, and a gear for rotating said shaft; with a rock-shaft, means actuated by said rock-shaft for imparting motion to said gear, a vibratile lever pivotally connected to said shaft so as to swing longitudinally thereof but not turn thereon, and a series of guide-slots for said lever to limit its movements, substantially as described.

13. The combination of registering-disks, a rotatable shaft for actuating the same, a gear for rotating said shaft, a rock-shaft, and means actuated by said rock-shaft for imparting motion to said gear in one direction; with a vibratile lever connected to said shaft, a series of guide-slots for said lever to limit its movements, a lock for said gear, and the lock-releasing mechanism actuated upon and by the complete depression of said lever, substantially as described.

14. The combination of the gear, a rock-shaft and connections for actuating the gear, the locking-lever for the gear, and dog for holding said lever out of locking position; with a vibrating lever for operating the rock-shaft, a series of slots for limiting the movement of said vibrating lever, and a vertically-movable bar at the lower ends of said slots adapted to be depressed by said lever, and the connections between said bar and dog, substantially as described.

15. The combination of registering-disks, key-levers and cams for throwing any of said disks into or out of operation, and a locking-plate for the key-levers, whereby upon depression of any key-lever previously-depressed levers are released; with a vibratile adding-lever, means actuated by said lever for rotating said disks, and vertical slots for regulating the extent of depression of the adding-lever, substantially as described.

16. The combination of the registering-disks, the rotatable clutches beside the disks, key-levers for throwing said clutches into or out of operation, and a locking-plate for the key-levers, whereby upon depression of any key-lever previously-depressed levers are released; with a vibratile adding-lever, means actuated by said lever for rotating said clutches, and vertical slots for regulating the extent of depression of the adding-lever, substantially as described.

17. The combination of a plurality of registering-disks, and mechanism for actuating the same in calculating operations; with a plurality of friction-disks, opposite the registering-disks, a laterally-movable shaft carrying said friction-disks, mechanism for moving said shaft to bring the friction-disks into contact with the registering-disks, and mechanism for simultaneously disengaging the registering-disks from their actuating mechanism, substantially as described.

18. The combination with a plurality of registering-disks, of a "carry-over" mechanism between adjoining disks, comprising a pair of connected spring-depressed arms, a catch beside the disk of lower denomination engaging one of said arms to uphold them, a pawl on the other arm adapted to move the "higher" disk one notch when the first arm is released, a pin on the "lower" disk adapted to disengage the catch from the arm, and means for resetting the "carry-over" mechanism after each operation thereof, substantially as described.

19. The combination of adjoining registering-disks and means for rotating such disks, an arm projecting beside the "lower" disk, and a connected arm projecting beside the "higher" disk, a catch beside the lower disk adapted to engage and uphold the adjoining arm, a spring for depressing said arms when the catch is released, a pawl on the other arm adapted to move the "higher" disk one notch when the arms are depressed, a link suspended from one of the arms, a vertically-movable bar adapted to engage and lift the link and arms after the latter have been depressed, and a pin on the "lower" disk for releasing said catch, substantially as described.

20. The combination of two registering-disks, and a "carry-over" mechanism comprising a pair of connected arms, a catch beside the lower disk engaging one of said arms to uphold them, a pawl on the other disk adapted to move the "higher" disk one notch when the arms are depressed, and a pin on the "lower" disk adapted to release the catch; with resetting devices for the "carry-over" mechanism, comprising a link suspended from one of the arms, a vibrating bar adapted to be engaged by the lower end of said link, and a lever pivoted beside the catch adapted to have its lower end loosely engage the lower end of the link when its upper end is actuated by the pin on the "lower" disk, all substantially as described.

21. The combination of two registering-disks, a vibrating lever and connections for actuating said disks, and a "carry-over" mechanism comprising a pair of connected arms, a catch beside the lower disk engaging one of said arms to uphold them, a pawl on the other disk adapted to move the "higher" disk one notch when the arms are depressed, a spring for depressing said arms, and a pin on the "lower" disk adapted to release the catch; with resetting devices for the "carry-over" mechanism, comprising a link suspended from one of the arms, a vibrating bar actuated from said lever adapted to be engaged by the lower end of said link, and a lever pivoted beside the catch constructed to have its lower end loosely engage the lower end of the link when its upper end is actuated by the pin on the "lower" disk, all substantially as described.

22. The combination of a plurality of independently-supported registering-disks, a shaft transfixing the disks, clutches splined on the shaft beside the several disks, key-levers and connections for locking any of said clutches to its respective disk, and means whereby when one lever is depressed the other levers are released, substantially as described.

23. The combination of a plurality of independently-supported registering-disks, a shaft transfixing the disks, clutches splined on the shaft beside the several disks, key-levers and connections for locking any of said clutches to its respective disk, and means whereby when one lever is depressed the other levers are released; with a series of friction-disks opposite the registering-disks, a laterally-movable shaft carrying the friction-disks, and a "setting-lever" and connections whereby when said lever is depressed the registering-disks are freed from their operative mechanisms, and the friction-disks brought into contact with the registering-disks, all substantially as described.

24. The combination of a plurality of independently-supported registering-disks, a shaft transfixing the disks, clutches splined on the shaft beside the several disks, key-levers and connections for locking any of said clutches to its respective disk, and means whereby when one lever is depressed the other levers are released, a rock-shaft and connections for rotating said shaft in one direction, an operating-lever for said shaft connected thereto so as to swing longitudinally thereof, and a series of guide-slots for said lever whereby the extent of oscillation of the shaft is regulated, substantially as described.

25. The combination of a plurality of independently-supported registering-disks, a shaft transfixing the disks, clutches splined on the shaft beside the several disks, key-levers and connections for locking any of said clutches to its respective disk, and means whereby when one lever is depressed the other levers are released, a rock-shaft and connections for rotating said shaft in one direction; an operating-lever for said shaft connected thereto so as to swing longitudinally thereof, and a series of guide-slots for said lever whereby the extent of oscillation of the shaft is regulated; with a series of friction-disks opposite the registering-disks, a laterally-movable shaft carrying the friction-disks, and a "setting-lever" and connections whereby when said lever is depressed the registering-disks are freed from their operative mechanisms, and the friction-disks brought into contact with the registering-disks, all substantially as and for the purpose set forth.

In testimony that I claim the foregoing as my own I affix my signature in presence of two witnesses.

GEORGE FRED MEIER.

In presence of—
  HENRY CUSTER,
  JOHN J. BROWN.